United States Patent [19]
Matsui

[11] Patent Number: 5,831,849
[45] Date of Patent: Nov. 3, 1998

[54] DATA CONTROL SYSTEM

[75] Inventor: Toshiya Matsui, Tokyo, Japan

[73] Assignee: NEC Corporation, Tokyo, Japan

[21] Appl. No.: 625,545

[22] Filed: Apr. 1, 1996

[30] Foreign Application Priority Data

Mar. 30, 1995 [JP] Japan .................................. 7-072803

[51] Int. Cl.⁶ .............................. G06F 1/30; G06F 11/30
[52] U.S. Cl. ...................... 364/132; 364/131; 364/146; 364/187; 395/182.2; 395/200.38
[58] Field of Search .................................. 364/131, 132, 364/238.3, 232.8, 240, 242.31, 187, 146, 141; 395/182.22, 800.01, 750.01, 750.08, 182.11, 200.38, 290, 750.07, 182.02, 182.2; 365/229, 230.01, 189.04

[56] References Cited

U.S. PATENT DOCUMENTS

| | | | |
|---|---|---|---|
| 4,288,849 | 9/1981 | Yoshida et al. | 364/132 |
| 4,383,184 | 5/1983 | McFarland | 395/182.12 |
| 4,775,976 | 10/1988 | Yokoyama | 395/182.11 |
| 5,151,855 | 9/1992 | Gray et al. | 395/182.22 |
| 5,227,981 | 7/1993 | Katsuki et al. | 364/483 |
| 5,343,427 | 8/1994 | Teruyama | 365/189.04 |
| 5,481,456 | 1/1996 | Ogura | 364/132 |
| 5,557,738 | 9/1996 | Townsley et al. | 395/182.12 |
| 5,583,754 | 12/1996 | Leonhardt et al. | 364/132 |

FOREIGN PATENT DOCUMENTS 375809   3/1991   Japan .

*Primary Examiner*—James P. Trammell
*Assistant Examiner*—Bryan Bui

[57] ABSTRACT

In a data control system according to the present invention, a data storage unit such as a memory or a register of each slave apparatus receives supply of power from a first power source which supplies power to a master apparatus, and is separated from a second power source which supplies power to different circuits of the slave apparatus except the data storage section. A CPU of the master apparatus has a function of discriminating operation conditions of the two first and second power sources and controlling initialization of the slave apparatus including the data storage units and the other circuits. Each of the slave apparatus includes a first power-on reset circuit for detecting power-on of the first power source and outputting an initialization reset signal for the data storage unit, and a second power-on reset circuit for detecting power-on of the second power source and outputting an initialization reset signal of the circuits other than the data storage unit.

4 Claims, 4 Drawing Sheets

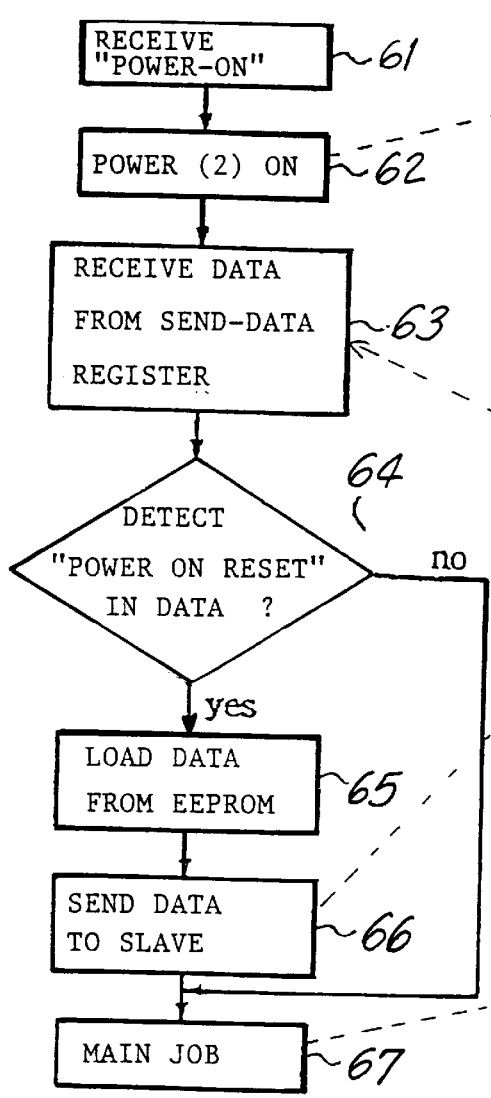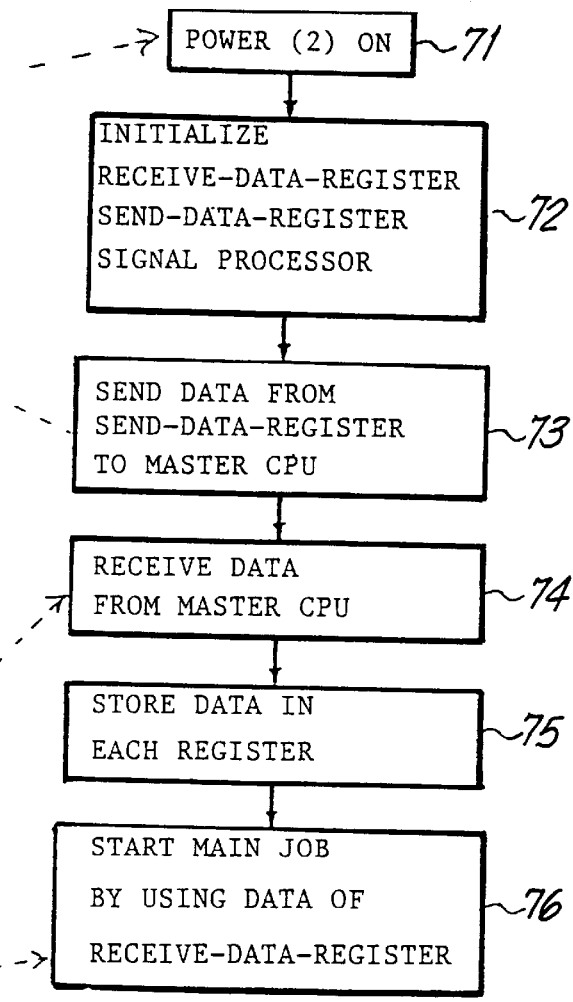

5,831,849

DATA CONTROL SYSTEM

BACKGROUND OF THE INVENTION

1. Field of the Invention

This invention relates to a data control system, and more particularly to a data control system which includes a master apparatus such as a television (TV) receiver, a video tape recorder (VTR) or a personal computer, and one or more slave apparatus such as a display apparatus for the master apparatus connected to the master apparatus by a serial data bus and receiving supply of power from a power source different from a power source for the master apparatus.

2. Description of the Related Art

FIG. 1 is a block diagram showing a system construction of an example of a conventional data control system. The system shown includes a master apparatus to which power is supplied from a first power source 44, and one or more slave apparatus to which power is applied from a second power source 47. The master apparatus includes a control signal receiver 41 for receiving a control signal from the outside such as a remote control switch, a central processing unit (CPU) 42, and an electrically erasable programmable read only memory (EEPROM) 43 in which control data such as initial setting values of the slave apparatus are stored. The slave apparatus (1) 45 and (2) 46 are displays or the like connected to the CPU 42 via a data bus 402. While, in the present example, the two slave apparatus (1) 45 and (2) 46 are shown as slave apparatus, the number of slave apparatus is not limited to two, but may be one or three or more.

FIG. 2 is a block diagram showing an internal construction of the slave apparatus (1) 45, (2) 46 and so forth described above. Each slave apparatus includes a power-on reset discrimination circuit 49, a signal processing circuit 50, a bus interface circuit 52, a reception data holding register 51 and a transmission data holding register 53, to which power is supplied from a connection terminal 48 of the second power source.

The power-on reset discrimination circuit 49 detects a rising edge of power supplied thereto from the connection terminal 48 for the second power source and outputs a power-on reset signal. The bus interface circuit 52 performs bidirectional data input/output to and from the data bus 402. The reception data holding register 51 holds reception data inputted from the bus interface circuit 52 whereas the transmission data holding register 53 holds data to be transmitted to the CPU 42 from the outputs of the signal processing circuit 50 and the power-on reset discrimination circuit 49. The signal processing circuit 50 processes data held by the reception data holding register 51.

Operation of the conventional system described above is described below.

Generally, in the system of the construction described above, the second power source for the slave apparatus is set, during standby, to an off state in order to minimize power dissipation.

In order to change over the condition of the system from the standby condition to a steady operation condition, a power-on instruction signal is sent from an external control signal inputting apparatus such as a remote control switch not shown. The signal is received by the control signal receiver 41 and transferred as control signal data 401 to the CPU 42. The CPU 42 converts the control signal data 401 into serial control data and outputs the serial control data to the data bus 402. The control data outputted to the data bus 402 is transferred to the slave apparatus (1) 45, (2) 46 and so forth in order to control the operation of the slave apparatus and also is written as holding data into the EEPROM 43.

The second power source 47 for supplying power to the slave apparatus is switched on in response to the control data outputted to the data bus 402. Consequently, the power-on reset discrimination circuit 49 detects a rising edge of the power supply of the second power source 47 and outputs a reset signal 403 to initialize the signal processing circuit 50, the reception data holding register 51 and the transmission data holding register 53. Thereupon, data indicating that the reset signal 403 has been outputted from the power-on reset discrimination circuit 49 is written into the transmission data holding register 53. The slave apparatus thus complete their initialization operation and enter a steady operation condition, in which each of them can receive, process and output transmitted data of a main work from the CPU 42.

In order to change over the condition of the system from the steady operation condition to a standby condition, a power-off instruction control signal is inputted, and the CPU 42 converts the control signal data 401 into power-off instruction control data and outputs the power-off instruction control data to the data bus 402. The second power source 47 for supplying power to the slave apparatus is switched off in response to the control data. Consequently, the supply of power to the power-on reset discrimination circuit 49, the signal processing circuit 50, the reception data holding register 51, the transmission data holding register 53 and the bus interface circuit 52 is stopped. In this instance, the internal data held in the reception data holding register 51 are erased by the stopping of power supply.

FIGS. 3(*a*) and 3(*b*) are flow charts illustrating operation of the CPU and the slave apparatus after a power-on instruction control signal is inputted and the second power source is switched on.

When the CPU 42 receives a power-on signal inputted from the control signal receiver 41 (step 61), the second power source 47 for supplying power to the slave apparatus is switched on (step 62). The CPU 42 receives data of the transmission data holding register 53 transmitted thereto from the slave apparatus (2) 46 via the data bus 402 (step 63) and discriminates whether or not a power-on reset signal is included in the received data (step 64). If the CPU 42 discriminates that a power-on reset signal is included in the received data, control data necessary for initialization of the slave apparatus are loaded into the CPU 12 from the EEPROM 43 (step 65). The data are transferred to the slave apparatus via the data bus 402 (step 66). Thereafter, the CPU 42 sends out main processing data to the data bus 402 and starts processing for a steady condition together with the slave apparatus (step 67).

Meanwhile, in each of the slave apparatus, as seen from FIG. 3(*b*), if the second power source 47 is switched on (step 71), the power-on reset discrimination circuit 49 detects the switching on of the power supply and outputs a power-on reset signal. In response to the power-on reset signal, the signal processing circuit 50, the reception data holding register 51 and the transmission data holding register 53 are initialized, and data indicating that the power-on reset signal has been outputted is written into the transmission data holding register 53 (step 72). Then, the data thus written in the transmission data holding register 53 are transferred to the CPU 42 via the data bus 402 (step 73). Consequently, control data are transmitted to the slave apparatus via the data bus 402 at step 66 of the CPU 42 (step 74). The data are stored into the reception data holding register 51 via the bus interface circuit 52 (step 75). The signal processing circuit 50 performs processing using the data held in the reception data holding register 51 (step 76).

In the conventional system described above, since the second power source for the slave apparatus is, during standby of the system, set to an off state and all data stored in the data holding registers of the individual slave apparatus are erased, in order to change over the condition of the system to a steady condition, it is necessary to switch on the second power source and transfer data for initialization to the individual slave apparatus via the data bus from the CPU. Consequently, the conventional system has a problem in that, as the number of slave apparatus installed increases, the data transfer time necessary for them increases and returning back to the steady condition is retarded.

Meanwhile, Japanese Patent Application Laid-open No. Heisei 3-75809(A)/1991, entitled "Initialization Processing Method for a Multiple CPU System", discloses an initialization processing method for a slave apparatus applied to a multiple system construction which includes master and slave CPUs. In particular, an external RAM with a backup battery is used as received data holding registers of slave apparatus and is divided with suitable addresses so that, upon initialization processing of the individual slave apparatus, it is used commonly by the master CPU and the slave CPUs.

This system, however, has a problem in that, since a parallel data bus is required for communication of data and an address signal from and to the external RAM, the system cannot be applied to a data control system for a serial bus.

SUMMARY OF THE INVENTION

It is an object of the present invention to provide a data control system for serial data which eliminates the problems of the conventional system described above and can initialize slave apparatus in a standby condition in a substantially fixed processing time irrespective of the number of slaves connected to the system.

In order to attain the object described above, according to the present invention, a data control system is constructed such that data storage units such as memories or registers of slave apparatus are supplied with power from a first power source which supplies power to a master apparatus, and are separated from a second power source which supplies power to individual circuits of the slave apparatus other than the data storage units.

A CPU of the master apparatus has a function of discriminating operation conditions of the two first and second power sources and controlling initialization of the slave apparatus including the data storage units and the other circuits, and each of the slave apparatus includes a first power-on reset circuit which detects power-on of the first power source and outputting an initialization reset signal for the data storage units, and a second power-on reset circuit for detecting power-on of the second power source and outputting an initialization reset signal for the circuits of the slave apparatus other than the data storage units.

Since the power source for supplying power to the data storage units of the slave apparatus is provided separately from the power supply circuit for the other circuits of the slave apparatus other than the data storage units while the power-on reset detection circuits are provided for the individual power sources to individually detect power supply conditions of the two power sources to the slave apparatus and the CPU discriminates whether or not initialization data should be transferred to the slave apparatus from an EEPROM, even if the second power source is stopped in order to save the power during standby or because of a failure, data stored in the data storage units can be held. Consequently, when the second power source is thereafter switched on, the initialization data for allowing transition of the system to a steady operation condition need not necessarily be transferred. As a result, startup of the slave apparatus can be performed rapidly.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIGS. 3(*a*) and 3(*b*) are flow charts illustrating operation of the conventional data control system of FIG. 1;

DETAILED DESCRIPTION OF THE PREFERRED EMBODIMENT

Figure 1:
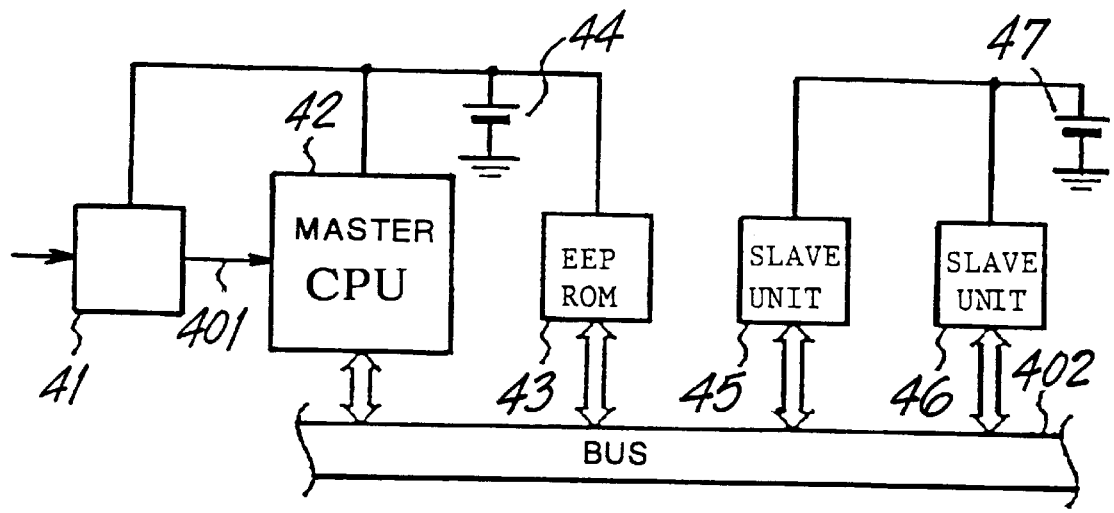
FIG. 1 is a block diagram showing a system construction of an example of a conventional data control system.
Figure 2:
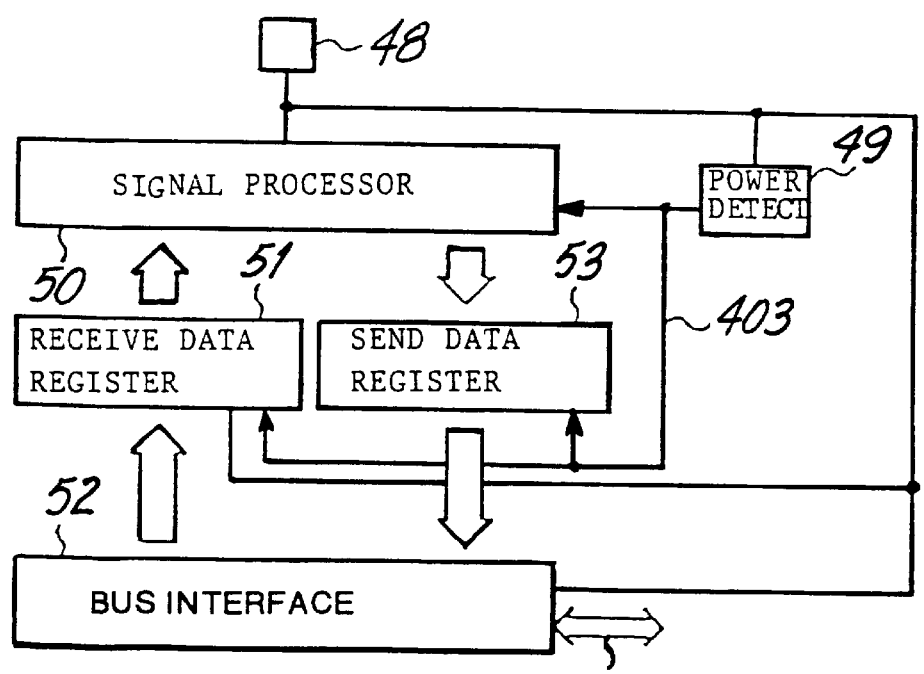
FIG. 2 is a block diagram showing a construction of each slave apparatus shown in FIG. 1.
Figure 4:
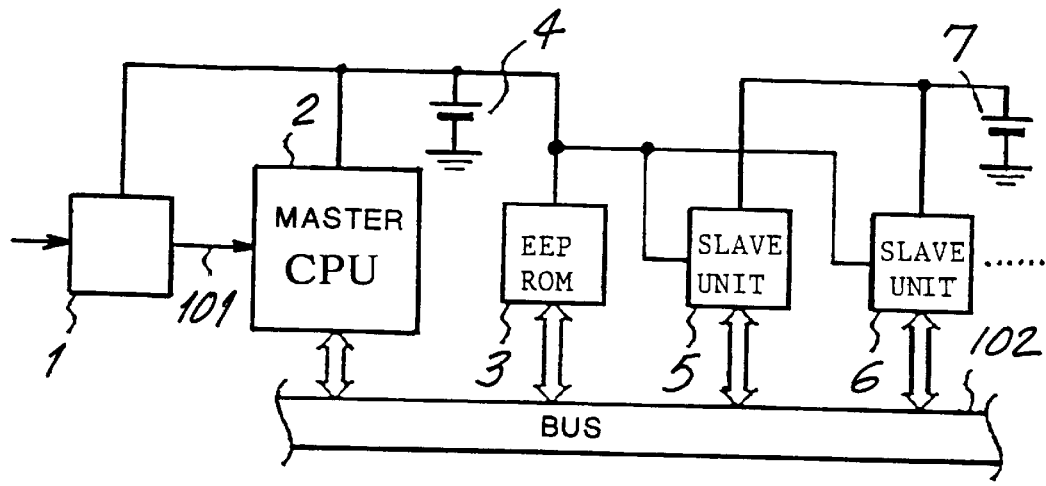
FIG. 4 is a block diagram showing a system construction of an example of a data control system according to the present invention.

Referring to FIG. 4, the data control system of the present embodiment includes a control signal receiver 1, a CPU 2, an EEPROM 3, a plurality of slave apparatus (1) 5, (2) 6 and so forth, a first power source 4 for supplying power to data storage units of the control signal receiver 1, the CPU 2, the EEPROM 3, and the plurality of slave apparatus (1) 5, (2) 6 and so forth, a second power source 7 for supplying power to the plurality of slave apparatus (1) 5, (2) 6 and so forth, and a data bus 102. While two slave apparatus of the slave apparatus (1) 5 and (2) 6 are shown in FIG. 4, the data control system may otherwise include only one slave apparatus or include one or more similar additional slave apparatus.

Figure 5:
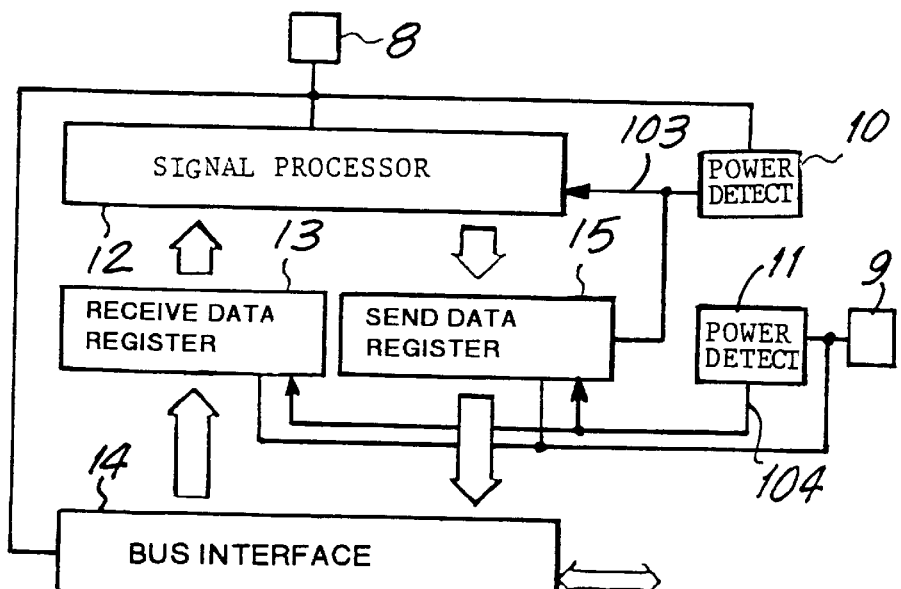
FIG. 5 block diagram showing a construction of each slave apparatus shown in FIG. 4.

Each of the slave apparatus (1) 5, (2) 6 and so forth has, as shown in FIG. 5, a connection terminal 8 for a second power source and a connection terminal 9 for a first power source and includes a power-on reset discrimination circuit 10 for detecting a rising edge of the second power source and outputting a reset signal, another power-on reset discrimination circuit 11 for detecting a rising edge of the first power source and outputting a reset signal, a bus interface circuit 14 for inputting and outputting data from and to the data bus 102, a reception data holding register 13 for holding data inputted from the bus interface circuit 14, a signal processing circuit 12 for processing the data held in the reception data holding register 13, and a transmission data holding register 15 for holding transmission data of the output of the signal processing circuit 12 and transmission data of the outputs of the power-on reset discrimination circuits 10 and 11.

Operation of the present embodiment is described below.

In a steady operation condition of the system, power is supplied from the first power source 4 to the control signal receiver 1, the CPU 2, the EEPROM 3 and the data holding registers 13 and 15 which correspond to data storage apparatus of each of the slave apparatus. Meanwhile, from the second power source 7, power is supplied to the signal processing circuits 12 and the bus interface circuits 14 which are circuits other than the data storage units of the slave apparatus.

A control signal is received and converted into control data 101 by the control signal receiver 1 and inputted to the CPU 2. Based on the control data 101, the CPU 2 transfers the control data to the slave apparatus (1) 5, (2) 6 and so forth via the data bus 102, and transfers and stores the same control data via the data bus 102 to and into the EEPROM 3 so that the control data are held by the EEPROM 3. Each of the slave apparatus detects a rising edge of the second power source 7 by means of the power-on reset discrimination circuit 10 and outputs a reset signal to initialize the slave apparatus itself so that signal processing is thereafter executed using the data stored in the reception data holding register 13.

In a standby condition of the system, in order to minimize power dissipation, the second power source 7 which supplies power to the connection terminals 8 of the slave apparatus is switched off in response to the control data transferred via the data bus 102 so that supply of power to the power-on reset discrimination circuit 10, the signal processing circuit 12 and the bus interface circuit 14 is stopped. Meanwhile, the first power source 4 for supplying power to the control signal receiver 1, the CPU 2, the EEPROM 3 and the connection terminals 9 for the first power source of the slave apparatus is normally kept on in order to enable reception of control data also in a standby condition of the system. Accordingly, the reception data holding registers 13 and the transmission data holding registers 15 connected to the connection terminals 9 of the slave apparatus receive supply of power from the first power source 4 also while the system is in a standby condition, and consequently hold the stored data without erasing the same.

Accordingly, also when the system enters a steady operation condition from a standby condition in response to a power-on instruction signal, since necessary data are held in the reception data holding registers 13, there is no need of transferring data for initialization to the slave apparatus from the CPU 2 again. It is to be noted that the power-on reset discrimination circuit 11 is constructed so as to operate in response to instantaneous disconnection of the first power source 4 so that the reception data holding register 13 and the transmission data holding register 15 may hold data.

Figure 6A:
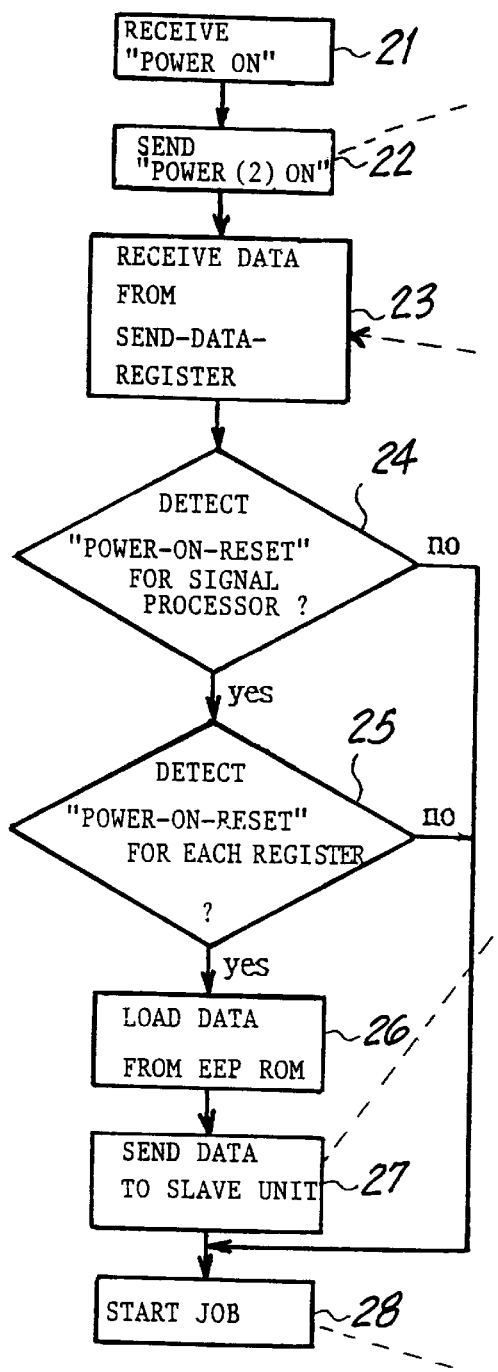
FIGS. 6,(*a*) and 6(*b*) are flow charts illustrating operation of the data control system according to the present invention.
Figure 6B:
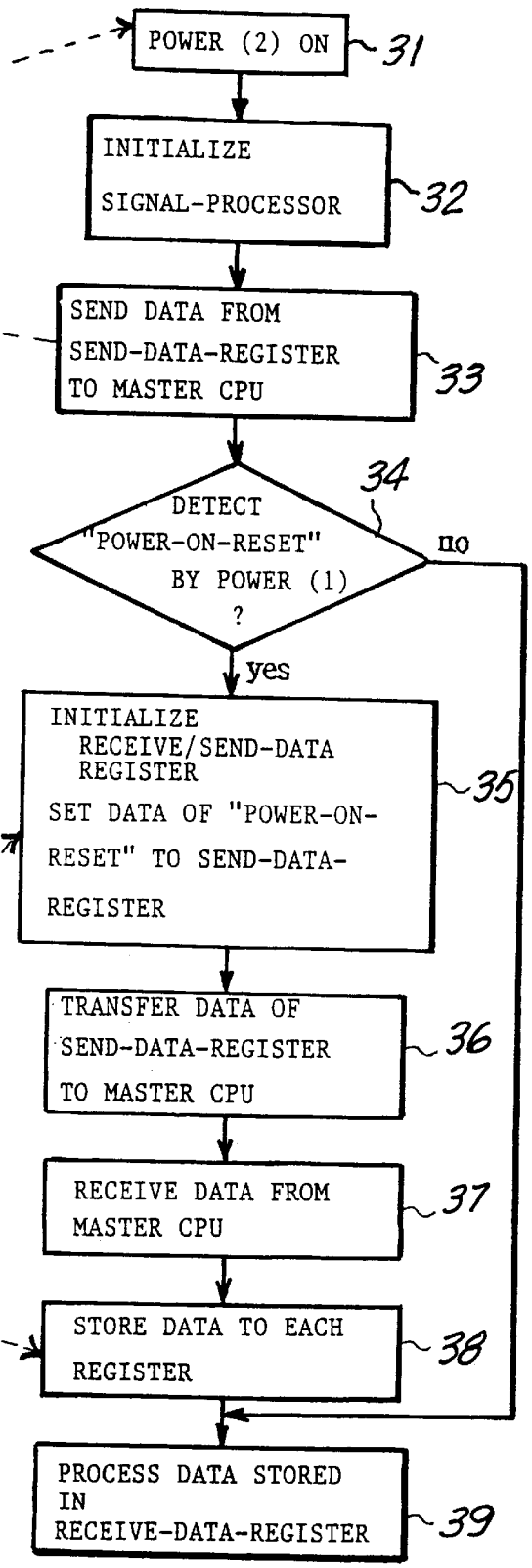

FIGS. 6(*a*) and 6(*b*) are flow charts illustrating procedures of operation of the CPU 2 and each slave apparatus of the present embodiment, respectively, when the second power source is switched on.

Referring to FIG. 6(*a*), if a power-on control signal 101 is inputted from the control signal receiver 1 (step 21), the second power source 7 for the slave apparatus is switched on (step 22). Then, the CPU 2 receives data of the transmission data holding register 15 transmitted thereto from each of the slave apparatus via the data bus 102 (step 23).

Then, the CPU 2 analyzes the received data to discriminate whether or not power-on has been detected by the power-on reset discrimination circuits 10 and 11 (steps 24 and 25). When the condition of the system changes over from a standby condition to a power source switched-on condition, since the first power source 4 has already been switched on, the received data do not indicate that no power-on has been detected by the power-on reset discrimination circuit 11 but power-on of the second power source 7 has been detected by the power-on reset discrimination circuit 10. Accordingly, when it is discriminated that power-on has not been detected by the power-on reset discrimination circuit 11 but has been detected by the power-on reset discrimination circuit 10, it is determined that the data of the slave apparatus are held, and transfer of data from the CPU 2 to the individual slave apparatus is not performed. But, if power-on is detected by both of the power-on reset discrimination circuit 11 and the power-on reset discrimination circuit 10, it is determined that also the first power source 4 which supplies power to the reception data holding registers 13 and 15 of the slave apparatus is reset once to erase the held data, and the CPU 2 loads the data from the EEPROM 3 (step 26). The data are transferred to the slave apparatus via the data bus 102 and stored into the reception data holding registers 13 (step 27).

After the data transfer of the EEPROM 3 at step 27, or when it is discriminated at steps 24 and 25 that the data of the slave apparatus are held, the CPU 2 performs main signal processing of a steady operation via the data bus 102 to the individual slave apparatus (step 28).

On the other hand, in each of the slave apparatus, as illustrated in FIG. 6(*a*), when the second power source 7 is first switched on (step 31), the power-on reset discrimination circuit 10 detects the switching on of the second power source 7 and outputs a reset signal to initialize the signal processing circuit 12. Further, the power-on reset discrimination circuit 10 sets to the transmission data holding register 15 data indicating that the second power source 7 has been switched on (step 32). Then, the data thus set in the transmission data holding register 15 are transferred to the CPU 2 via the data bus 102 (step 33). The power-on reset discrimination circuit 11 discriminates whether or not a reset signal has been outputted to the first power source (step 34). If a reset signal has been outputted, both of the reception data holding register 13 and the transmission data holding register 15 are initialized (step 35), and then, the data of the transmission data holding register 15 are transferred to the CPU 2 (step 36). As a result, data transferred at step 27 of the CPU 2 are received (step 37) and are stored into the reception data holding register 13 and the transmission data holding register 15 (step 38).

The slave apparatus enters a steady operation condition after completion of the processing of data storage at step 38 or when it is discriminated at step 34 that a reset signal has not been outputted to the first power source, and the data stored in the reception data holding register 13 are processed by the signal processing circuit 12.

As described above, according to the present invention, since a power supply circuit for data storage units of slave apparatus is provided separately from a power supply circuit for the other circuits of the slave apparatus such that, also when supply of power to the other circuits of the slave apparatus than the data storage units is off in a standby condition of the system, power is supplied to the data storage units to hold data stored in the data storage units of the slave apparatus while operations of the two power supply circuits are monitored, there is an effect that, upon transition from a standby condition to a steady operation condition, transfer of initialization data to the slave apparatus can be omitted, and consequently, transition to a steady operation condition can be performed rapidly.

It is to be understood that variations and modifications of the data control system disclosed herein will be evident to those skilled in the art. It is intended that all such modifications and variations be included within the scope of the appended claims.

What is claimed is:

1. A control method for a data control system, comprising the steps of:

supplying power from a first power source to a master apparatus which includes a main storage apparatus in which data including an initialization parameter is stored and a CPU for transferring data via a serial data bus;

supplying power from a second power source to each of slave apparatus which process and output the data transferred thereto;

supplying power from said first power source separately to a data storage circuit from among different circuits of each of said slave apparatus;

monitoring on/off of said second power source and said first power source;

responding to an instruction of said master apparatus by supplying, upon steady operation, power to circuits of said slave apparatus excepting said data storage circuits, from said second power source, and terminating said supply of power during standby;

keeping, during standby, said first power source on to continue supply of power to the data storage circuits while switching off said second power source to stop supply of power to the other circuits of said slave apparatus;

resetting, when transition of said second power source from off to on is detected during supply of power of said first power source, the circuits of said slave circuit based on control data stored in the data storage circuits; and requesting, when power-on of said first power source and said second power source is detected, said main storage apparatus for transfer of the control data to reset all of the circuits of the slave apparatus including said data storage circuits;

holding initialization data of each of the slave apparatus in said slave's data storage circuit;

monitoring an operation condition of said first power source, detecting power-on or power-off of said first power source, notifying said master apparatus of said power-on or power-off detection, and outputting in response to an instruction of said master apparatus an initialization reset signal to said data storage circuit; and monitoring an operation condition of said second power source, detecting power-on or power-off of said second power source, notifying said master apparatus of said power-on or power-off detection, and outputting in response to an instruction of said master apparatus an initialization reset signal to the circuits other than said data storage circuit.

2. A control method for a data control system according to claim 1 and further comprising the steps of:

instructing, when power-on of said first power source is detected, power-on and initialization resetting to all circuits of said slave apparatus; and instructing, when transition from power-off to power-on of said second power source is detected during power-on of said first power source, power-on of said second source and initialization resetting of the other circuits of said slave apparatus except said data storage circuits.

3. A data control system, comprising:

first power source means for supplying power to data storage circuit of slave apparatus and a master apparatus including a main storage apparatus;

second power source means operable in response to an instruction of said master apparatus for supplying, upon steady operation, power to circuits of said slave apparatus except said data storage circuits, but stopping, during standby, the supply of power;

a first power-on reset circuit for detecting power-on of said first power source means and outputting an initialization reset signal for said data storage circuits;

a second power-on reset circuit for detecting power-on of said second power source means and outputting an initialization reset signal for the other circuits other than said data storage circuits;

slave starting means for resetting, when power-on of said second power source means is detected during supply of power of said first power source means, the circuits of said slave apparatus based on control data stored in said data storage circuits; and means for requesting, when power-on of said first power source means and said second power source means is detected, said main storage apparatus for transfer of the control data to reset all of the circuits of said slave apparatus including said data storage circuits;

wherein each of said slave apparatus includes said data storage circuit for holding initialization data of the slave apparatus itself, first power-on reset means for monitoring an operation condition of said first power source means, notifying power-on or power-off of said first power source means to said master apparatus and outputting, in response to an instruction of said master apparatus, an initialization reset signal to said data storage circuit, and second power-on reset means for monitoring an operation condition of said second power source means, notifying power-on or power-off of said second power source means to said master apparatus and outputting, in response to an instruction of said master apparatus, an initialization reset signal to the circuits other than said data storage circuit.

4. A data control system according to claim 3, wherein said master apparatus includes control means for instructing, when power-on of said first power source means is detected, power-on and initialization resetting to all circuits of said slave apparatus, but instructing, when transition from power-off to power-on of said second power source means is detected during power-on of said first power source means, power-on of said second power source means and initialization resetting of the other circuits of said slave apparatus except said data storage circuits.

* * * * *